US010611687B2

(12) United States Patent
Hendrickson et al.

(10) Patent No.: US 10,611,687 B2
(45) Date of Patent: *Apr. 7, 2020

(54) COATED-FINE-AGGREGATE, CONCRETE COMPOSITION AND METHOD

(71) Applicant: AQUASMART ENTERPRISES, LLC, Lubbock, TX (US)

(72) Inventors: Calder Hendrickson, Lubbock, TX (US); Todd Naff, Lubbock, TX (US)

(73) Assignee: AQUASMART ENTERPRISES, LLC, Lubbock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,795

(22) Filed: Nov. 28, 2018

(65) Prior Publication Data
US 2019/0177225 A1 Jun. 13, 2019

Related U.S. Application Data

(60) Continuation of application No. 15/710,489, filed on Sep. 20, 2017, now Pat. No. 10,150,701, which is a division of application No. 15/168,821, filed on May 31, 2016, now Pat. No. 9,783,457, which is a division of application No. 14/321,441, filed on Jul. 1, 2014, now Pat. No. 9,359,253.

(51) Int. Cl.
C04B 24/28 (2006.01)
C04B 16/04 (2006.01)
C04B 20/10 (2006.01)
C04B 40/06 (2006.01)
B01J 20/26 (2006.01)
B28B 1/14 (2006.01)
B28B 17/02 (2006.01)
E04G 21/02 (2006.01)
C04B 14/06 (2006.01)
C04B 28/02 (2006.01)
C04B 28/14 (2006.01)
C04B 103/00 (2006.01)

(52) U.S. Cl.
CPC ........... C04B 24/287 (2013.01); B01J 20/262 (2013.01); B28B 1/14 (2013.01); B28B 17/02 (2013.01); C04B 14/06 (2013.01); C04B 16/04 (2013.01); C04B 20/1033 (2013.01); C04B 28/02 (2013.01); C04B 28/14 (2013.01); C04B 40/0633 (2013.01); E04G 21/02 (2013.01); C04B 2103/0051 (2013.01)

(58) Field of Classification Search
CPC ... C04B 24/287; C04B 16/04; C04B 20/1033; C04B 28/14; C04B 14/06; C04B 28/02; C04B 40/0633; C04B 2103/0051; B28B 17/02; B28B 1/14; B01J 20/262
USPC .......................................................... 524/4
See application file for complete search history.

(56) References Cited

U.S. PATENT DOCUMENTS

| 2,690,388 | A | 9/1954 | Hale |
| 2,967,789 | A | 1/1961 | Hoyt |
| 2,991,267 | A | 7/1961 | Bean |
| 3,442,803 | A | 5/1969 | Hoover et al. |
| 3,648,631 | A | 3/1972 | Fiedler et al. |
| 3,752,233 | A | 8/1973 | Svaldi et al. |
| 3,768,565 | A | 10/1973 | Persinski et al. |
| 3,841,402 | A | 10/1974 | Knight et al. |
| 3,868,328 | A | 2/1975 | Boothe et al. |
| 3,943,060 | A | 3/1976 | Martin et al. |
| 3,973,355 | A | 8/1976 | McKenzie |
| 4,195,010 | A | 3/1980 | Russell et al. |
| 4,247,331 | A | 1/1981 | Hamlin et al. |
| 4,579,578 | A | 4/1986 | Cooke |
| 4,741,401 | A | 5/1988 | Walles et al. |
| 5,093,130 | A | 3/1992 | Fuji et al. |
| 5,352,290 | A | 10/1994 | Takeshita et al. |
| 5,394,812 | A | 3/1995 | Dunning et al. |
| 5,450,985 | A | 9/1995 | Meuleman |
| 5,794,550 | A | 8/1998 | Chadwick |
| 5,806,593 | A | 9/1998 | Surles |
| 6,395,051 | B1 | 5/2002 | Arnold et al. |
| 6,669,752 | B2 | 12/2003 | Arnold et al. |

(Continued)

FOREIGN PATENT DOCUMENTS

EP 2067753 6/2009
JP 11-092188 4/1999

(Continued)

OTHER PUBLICATIONS

Kevern et al., Transportation Research Record: Journal of the Transportation Research Board, No. 2290, 1150121, 2012. (Year: 2012).*
Drill & Fill Manufacturing. Turf Tractor Specifications. http://www.drillandfillmfg.com/tractor.html. Accessed May 27, 2008.
Drill & Fill Manufacturing. DF24—Drill & Fill Aerator Head Specifications. http://www.drillandfillmfg.com/drillfill.html. Accessed May 27, 2008.

(Continued)

Primary Examiner — Hui H Chin
(74) Attorney, Agent, or Firm — Pate Baird, PLLC

(57) ABSTRACT

A concrete composition and method include a portion of fine aggregate bearing a coating of a polymer, which may be a continuous coating layer or a layer of powdered, discrete particles embedded in a binder. The polymeric coating may be a super absorbent polymer (insoluble in water, but absorbing water), or another polymer such as the acrylamides, co-polymers thereof, polyacrylamides, or the like (soluble in water). The coating absorbs water, but particles are too small to form significant voids. Water is absorbed into the concrete mix in far greater proportions (e.g. w/c ratio over 0.5) improving workability, doubling workability time, and improving ultimate compressive stress (strength).

20 Claims, 10 Drawing Sheets

(56) References Cited

U.S. PATENT DOCUMENTS

| | | | |
|---|---|---|---|
| 6,840,318 B2 | 1/2005 | Lee et al. |
| 7,135,231 B1 | 11/2006 | Sinclair et al. |
| 7,156,194 B2 | 1/2007 | Nguyen |
| 7,216,705 B2 | 5/2007 | Saini et al. |
| 7,244,492 B2 | 7/2007 | Sinclair et al. |
| 7,334,640 B2 | 2/2008 | Hanes, Jr. et al. |
| 7,510,656 B2 | 3/2009 | Shafer et al. |
| 7,527,736 B2 | 5/2009 | Shafer et al. |
| 7,628,919 B2 | 12/2009 | Shafer et al. |
| 7,722,770 B2 | 5/2010 | Shafer et al. |
| 7,726,070 B2 | 6/2010 | Thrash |
| 7,814,980 B2 | 10/2010 | Bryant et al. |
| 7,888,297 B2 | 2/2011 | Hanes, Jr. et al. |
| 8,196,346 B2 | 6/2012 | Thrash |
| 8,341,881 B2 | 1/2013 | Thrash |
| 8,354,360 B2 | 1/2013 | Phatak |
| 8,453,377 B2 | 6/2013 | Thrash et al. |
| 8,510,986 B2 | 8/2013 | Thrash |
| 8,653,163 B2 * | 2/2014 | Honert | C04B 20/1033 524/4 |
| 8,661,729 B2 | 3/2014 | Hendrickson et al. |
| 8,739,526 B2 | 6/2014 | Tandler et al. |
| 2003/0046865 A1 | 3/2003 | Nishiyama |
| 2004/0244978 A1 | 12/2004 | Shaarpour |
| 2005/0005869 A1 | 1/2005 | Fritter et al. |
| 2005/0069566 A1 | 3/2005 | Tamarkin et al. |
| 2006/0078682 A1 | 4/2006 | McDaniel et al. |
| 2006/0211580 A1 | 9/2006 | Wang et al. |
| 2007/0036977 A1 | 2/2007 | Sinclair et al. |
| 2007/0074315 A1 | 3/2007 | Collin |
| 2008/0045422 A1 | 2/2008 | Hanes et al. |
| 2008/0064614 A1 | 3/2008 | Ahrenst et al. |
| 2008/0230223 A1 | 9/2008 | McCrary et al. |
| 2009/0065253 A1 | 3/2009 | Suarez-Rivera et al. |
| 2010/0160449 A1 | 6/2010 | Rovison, Jr. et al. |
| 2010/0222242 A1 | 9/2010 | Huang et al. |
| 2010/0248997 A1 | 9/2010 | Li et al. |
| 2010/0307749 A1 | 12/2010 | Nguyen et al. |
| 2011/0017677 A1 | 1/2011 | Evans |
| 2011/0098377 A1 | 4/2011 | Huang et al. |
| 2011/0245113 A1 | 10/2011 | Phatak |
| 2011/0245114 A1 | 10/2011 | Gupta et al. |
| 2012/0190593 A1 | 7/2012 | Soane et al. |
| 2012/0225800 A1 | 9/2012 | Hendrickson |
| 2012/0305254 A1 | 12/2012 | Chen et al. |
| 2013/0161003 A1 | 6/2013 | Makarychev-Mikhailov et al. |
| 2014/0000891 A1 | 1/2014 | Mahoney et al. |

FOREIGN PATENT DOCUMENTS

| | | | |
|---|---|---|---|
| JP | 2000-290051 | 10/2000 |
| JP | 2000290051 A | * 10/2000 | ......... C04B 40/0039 |
| WO | WO 8501736 | 4/1985 |
| WO | WO 02060681 | 8/2002 |
| WO | WO 2009102565 | 8/2009 |

OTHER PUBLICATIONS

Drill & Fill Manufacturing. D60—Drill Aerator Head Specifications. http://www.drillandfillmfg.com/drill.html. Accessed May 27, 2008.

Drill & Fill Manufacturing. Drill & Fill Aerification. http://www.drillandfillmfg.com/options.html. Accessed May 27, 2008.

Hogentogler & Co., Inc. Sieves: ASTM E-11 / AASHTO T-27. M-92. http://www.hogentogler.com/sieves/200mm_metric_sieves.htm. Accessed Dec. 11, 2007.

Graden USA, Inc. CSI Contour Sand Injection Specifications. http://www.gradenusa.com/_Sand_Injection.php. Accessed May 27, 2008.

Silica Fume Association. "What is Silica Fume?" http://www.silicafume.org/general-silicafume.html. Accessed May 27, 2008.

AZ Materials. Silica—Fumed Silica (Silicon Dioxide). http://www.azom.com/details.asp?ArticleID=1386. Accessed May 27, 2008.

DryJect: Soil Amendments. http://www.dryject.com/dryject/profile.cfm. Accessed May 27, 2008.

DryJect: How it Works. http://www.dryject.com/dryject/howitworks/index.cfm. Accessed May 27, 2008.

Technische Universitat Dresden, International Conference, Application of Superabsorbent Polymers and Other New Admixtures in Concrete Construction, Sep. 14-17, 2014.

Structure Magazine, Internal Curing, Constructing More Robust Concrete, Jason Weiss, Dale Bentz, Anton Schindler, P.E. and Pietro Lura, Jan. 2012, pp. 10, 12-14.

Elsevier, Materials Science & Engineering A, Micromechanical analysis of polyacrylamide-modified concrete for improving strengths, Zengzhi Sun, Qinwu Xu, Jan. 4, 2008, pp. 182-191.

Reducing Curing Requirements for Pervious Concrete with a Superabsorbent Polymer for Internal Curing, John T. Kevern and Chris Farney, 2012, pp. 115-121.

Uetae, Investigating the Use of Super Absorbent Polymer in Plain Concrete, Moayyad Al-Nasra and Mohammad Daoud, pp. 598-603, vol. 3, Issue 8, Aug. 2013.

Concrete International, Use of Superabsorbent Polymers in Concrete, O. Mejhede Jensen, Jan. 2013, pp. 48-52.

Halliburton, Baroid, BARASCAV™ D, Product Data Sheet, May 19, 2010.

* cited by examiner

| Mix | Cement (lbs) | Water (lbs) | Fine Aggregate (lbs) | Coarse Aggregate (lbs) | LWA (lbs) | CFA (lbs) | W/C | Slump (in) |
|---|---|---|---|---|---|---|---|---|
| Control | 26 | 13 | 52 | 52 | 0 | 0 | 0.50 | 3 |
| Coated | 26 | 19 | 47 | 52 | 0 | 5 | 0.73 | 3 |

FIG. 5

| Mix | Cement (lbs) | Water (lbs) | Fine Aggregate (lbs) | Coarse Aggregate (lbs) | LWA (lbs) | CFA (lbs) | W/C | Slump (in) |
|---|---|---|---|---|---|---|---|---|
| Base | 26.3 | 10 | 53.6 | 42 | 0 | 0 | 0.38 | [3] |
| Control 1 | 26.3 | 13.5 | 53.6 | 42 | 0 | 0 | 0.51 | 8 |
| LWA | 26.3 | 15 | 40.2 | 42 | 13.4 | 0 | 0.57 | 8 |
| Coated 1 | 26.3 | 21 | 50.4 | 42 | 0 | 3.2 | 0.79 | 8 |
| Control 2 | | | | | | | | 3 |
| Coated 2 | | | | | | | | 3 |

FIG. 6

| | Wet | | |
|---|---|---|---|
| Day 7: Compressive Strength | Control | CFA | LWA |
| (PSI) | 2311 | 2330 | 2405 |
| (MPa) | 16.177 | 16.31 | 16.835 |
| Day 21: Compressive Strength | | | |
| (PSI) | 2936 | 2909 | 2985 |
| (MPa) | 20.552 | 20.363 | 20.895 |
| Day 28: Compressive Strength | | | |
| (PSI) | 3240 | 3267 | 3260 |
| (MPa) | 22.68 | 22.869 | 22.82 |
| Flexure Strength | | | |
| (PSI) | 404 | 408 | 410 |
| (MPa) | 2.828 | 2.856 | 2.87 |
| Split Tension | | | |
| (PSI) | 106 | 108 | 105.03 |
| (MPa) | 0.742 | 0.756 | 0.73521 |

FIG. 7

| | Dry | | |
|---|---|---|---|
| Day 7: Compressive Strength | Control | CFA | LWA |
| (PSI) | 1820 | 1600 | 1700 |
| (MPa) | 12.74 | 11.2 | 11.9 |
| Day 21: Compressive Strength | | | |
| (PSI) | 2250 | 2310 | 2390 |
| (MPa) | 15.75 | 16.17 | 16.73 |
| Day 28: Compressive Strength | | | |
| (PSI) | 2320 | 2900 | 2460 |
| (MPa) | 16.24 | 20.3 | 17.22 |
| Flexure Strength | | | |
| (PSI) | 352 | 390 | 360 |
| (MPa) | 2.464 | 2.73 | 2.52 |
| Split Tension | | | |
| (PSI) | 76.5 | 95 | 83 |
| (MPa) | .05355 | .0665 | 0.581 |

FIG. 8

COATED-FINE-AGGREGATE, CONCRETE COMPOSITION AND METHOD

BACKGROUND

1. Field of the Invention

This invention relates to concrete and, more particularly, to novel systems and methods for formulation of concrete mixtures to improve mechanical and processing properties and characteristics.

2. Related Applications

This application is a divisional of U.S. patent application Ser. No. 15/710,489, filed Sep. 20, 2017; which is a divisional of U.S. patent application Ser. No. 15/168,821, filed May 31, 2016; issued as U.S. Pat. No. 9,783,457 on Oct. 10, 2017; which is a divisional of U.S. patent application Ser. No. 14/321,441, filed Jul. 1, 2014, issued as U.S. Pat. No. 9,359,253 on Jun. 7, 2016, both of which are hereby incorporated by reference in their entirety.

This application also incorporates by reference U.S. Provisional Patent Application Ser. No. 61/918,277, filed Dec. 19, 2013; U.S. Provisional Patent Application Ser. No. 61/531,042, filed Sep. 5, 2011; U.S. patent application Ser. No. 14/171,920, filed Feb. 4, 2014; U.S. patent application Ser. No. 13/599,735, filed Aug. 30, 2012; U.S. patent application Ser. No. 13/598,135, filed Aug. 29, 2010; U.S. patent application Ser. No. 13/418,227, filed Mar. 12, 2012; U.S. Pat. No. 8,739,464, issued Jun. 3, 2014; U.S. Pat. No. 8,661,729, issued Mar. 4, 2014; U.S. Pat. No. 8,510,986, issued Aug. 20, 2013; U.S. Pat. No. 8,453,377, issued Jun. 4, 2013.

3. Background Art

Concrete is a common construction material. It is used for footings and foundations routinely. It is sometimes used for walls of buildings or other walls for other architectural purposes. It is sometimes used for floors and ceilings of buildings. It has been formulated over many years to include aggregate, cement, and water. It is typical in construction that higher ratios of water to cement will compromise the compressive strength of concrete. Concrete has a comparatively little tensile strength.

Meanwhile, reducing the ratio of water to cement creates challenges in the workability of concrete. Typically, the ratio of water to cement influences a property called slump. Slump characterizes the tendency of concrete to flow down due to fluid in it rather than to stack up due to aggregate in it. Inasmuch as concrete is largely solid material, commonly called aggregate and constituted by coarse aggregate such as rock, gravel, or both, and fine aggregate constituted by some type of sand, the solid materials may tend to stack if the cement is comparatively thick or stiff. With more water, the cement fluid or "paste" formed by the wetted cement powder and added water tends to lubricate and separate the aggregate such that it will flow down to a greater extent.

Low ratios of water to cement tend to produce stronger concrete (greater compressive stress before failure limits), whereas greater ratios of water to cement tend to delay setting up of the concrete, and thereby provide improved ability to work the concrete, form it, surface treat it, finish it, and so forth. Also, more working time and better flow improves the reduction of voids, the compacting or vibrating of the aggregate into place, the filling in by the cementitious fluid of cement and water among all the interstices, and so forth.

Concrete has various phenomena acting during its cure process. Curing is a chemical process whereby the cementitious fluid becomes a solid by the chemical reaction of water with the cement. Curing involves both reaction of molecules of the cement with the water and with each other to form bonds. It also involves a drying process whereby any excess water may be evaporated away from the concrete.

During cure of concrete, the presence or absence of water may affect the curing, cracking, strength, and so forth. For example, external surfaces may tend to dry too quickly. This causes shrinkage and small cracks. Meanwhile, the internal portion of a concrete structure may take more time, but may have insufficient water to complete the chemical reactions that are available with the molecules of the cement material.

Thus, two types of concrete curing are common. One is to provide a water layer over the concrete to maintain hydration at the surface and prevent drying during cure. Another is to rely on sufficient internal water, sometimes a comparatively excess amount of mixed in water, while also covering the concrete or sealing it against evaporation. Thus, one method is referred to as a wet cured concrete in which the surface is maintained and moist. The other is called internal cure It would be an advance in the art to provide a mechanism that could improve workability of concrete, without compromising its ultimate strength. It would also be an advance in the art to provide water during internal curing. It would also be an advance to do so without leaving voids of a size that creates stress concentrations and initiates fractures. It would also be an advance to better seal against perviousness, and reduce shrinkage and its associated stress, strain, and cracking in concrete.

BRIEF SUMMARY OF THE INVENTION

In view of the foregoing, in accordance with the invention as embodied and broadly described herein, a method and apparatus are disclosed in one embodiment of the present invention as including a composition and method relying on a coarse aggregate, fine aggregate, cement, and a treated or coated fine aggregate portion. The fine aggregate may be any suitable material currently used. The coarse aggregate may likewise be suitable larger pieces, such as gravel, rock, or both.

The coated fine aggregate may involve sand, of a suitable size, acting as a substrate and treated with a coating of a hydrophilic, polymeric material. The coating may be coated directly on the substrate as a liquid later dried. Instead it may be bound to a substrate by a binder securing a powder or dust made of a polymeric material such as an acrylamide polymer, polyacrylamide, or co-polymer acrylamide (collectively PAM) or the like. It may instead be made of any super absorbent polymer (SAP).

A difficulty with the addition of polymers other than cement is the side effects. For example, it is known to use various plasticizers, hardening chemicals such as chlorides that also act as curing accelerants, and the like in order to modify the cure rates, strength, working properties, and so forth. However, although these additives modify the properties desired, but often bring with them unwanted side effects. They often sacrifice other properties (e.g., working time) that are sometimes as important as the preferred property (e.g., strength or hardness) that they improve.

The substrate may be coated with a binder that operates as a tackifier, adhesive, or the like. In some embodiments, the tackifier or binder may simply be a solvent that partially dissolves the powdered polymer materials or liquefied polymer material that will coated onto the substrate.

In some embodiments, the polymer may be barely adhered to the binder secured to a substrate (e.g., sand). In other embodiments, the binder may be of a comparatively thick tackifier, such as a material identified in any of the patent references incorporated hereinabove by reference. The binder layer may be a comparatively thicker or comparatively thinner layer. By thicker is meant that a significant portion, such as from about ¼ to about ¾ (or even from 10% to 90%) of the effective diameter of the polymer powder is actually embedded within the tackifying material or binder. In other embodiments, a solvent such as water, alcohol, or other solvent that will dissolve the powdered particles of the water-absorbing polymer may operate to dissolve a portion of each polymer and thereby form a binder to secure the particles to the substrate. Solvent and a portion of polymer may be premixed together as a binder, or simply interact on contact.

In some embodiments, in order to manage and otherwise manipulate the rates of absorption, the operation of the water absorbing polymer coating the substrate, or the like, a shell or final layer may be formed over the top of the particles of the polymer once on the substrate. This may delay or slow hydration of the polymer or resist its separation from the substrate for a predetermined time established by the physical properties of the shell layer. The absorption rate of or access to, water may be used to control the water absorbing polymer. Again, liquid layers, powdered layers, or a combination may be used to coat a substrate. Several suitable materials and processes are disclosed in the references incorporated hereinabove by reference.

In one embodiment a composition comprising coarse aggregate, fine aggregate (substantially smaller than the coarse aggregate), cement, and a polymer coated aggregate is activated with water. The polymer coated aggregate is a comparatively finely divided aggregate, and may be similar to or the same as a portion of the fine aggregate. It may also come from another source. Sand of any masonry or concrete type may be typical, and may be washed to remove fines or to provide a consistent size and ability to adhere a layer of hydrophilic polymer, either as a "painted on" (liquid, subsequently dried or cured) or a powder secured to a fine aggregate substrate.

Powder formed of a polymer may be selected from an acrylamide, an acrylamide co-polymer, a polyacrylamide (PAM), a super absorbent polymer (SAP), or other similar hydrophilic material. A binder may bind a powder to the substrate by any of several mechanisms including simple adhesion of a tacky substance, curing of a glue-like binder, partial dissolving of the polymer and subsequent drying thereof, solvent binding by a solvent dissolving powder particles, solvent binding by a mixture of a solvent, such as water, and a polymer, such as an acrylamide, making a coating binder that readily forms an ionic bond with the dry powder when coated thereon, or the like.

The cement, once mixed with water is constituted in a fluid flowable to lubricate the coarse aggregate and fine aggregate to an extent effective for pouring and casting the composition. Meanwhile, the polymer is hydrated by a portion of the water, which water is subsequently releasable by the polymer, providing at least one of additional water for workability, water for reaction of cement chemistry, water for reduction of surface shrinkage, and slowing of surface or other drying of the curing concrete.

In its cured state, the concrete has voids sized and spaced at respective distances effective to maintain compressive strength at least as high as that of the composition absent voids. Thus stress concentrations, and gaps are minimized, improving concrete strength.

A target for the proportions of constituents may be about two parts cement, about four parts fine aggregate, about four parts coarse aggregate, about 1.5 parts water, and about ten percent of the fine aggregate further bearing a coating of the polymer. In another formulation, the cement constitutes from about one and a half to about two and a half parts, while the fine aggregate constitutes from about 3 to about 5 parts, the coarse aggregate constitutes from about 3 to about 5 parts, and water constitutes from about 1.25 to about 2 parts.

A method may include selecting a coarse aggregate, fine aggregate, cement, and a polymer. Thereupon, one may provide a coating on a portion of the fine aggregate, then mix the constituents with water. Casting the mixture into a restraint such as a form or mold is effective to mold the mixture to a shape.

The coating provides water effective to maintain fluidity of the mixture for a period greater than one and a half hours, even more than double that, even 2 hours in certain tests. Thus the concrete is pourable and workable much longer than conventional concrete. Moreover, the polymer releases water for supporting complete reaction of the cement as it combines with the water in a chemical reaction. Curing by the cement from a liquidous state to a solid state results in not only no loss in strength, but increased strength and increased volume, not only in the liquidous state, but also in the solid, cured state.

Although natural polymers may be used, such as gelatin, guar, and the like, synthetic polymers as powders or very small spheres, having a mean effective diameter substantially less than that of the fine aggregate, are available, cost effective, and serve well. Both soluble (acrylamides, co-polymers of acrylates and acrylamides, and polyacrylamides) and insoluble polymers (SAP) work. Commercially, there is some variation in referring to acrylic, acrylic acid, acrylamide, and the like-based polymers, and it is found that polyacrylamide, a co-polymer or polymer of at least one of an acrylate, acrylic, acrylamide, acrylamide compounds, and the like appear to serve, as do various super absorbent polymers (SAP) of other types. Acrylamides, as a class, tend to be soluble, while SAP materials, as a class, tend not to be.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 5 is a table illustrating results of testing of one embodiment of a composition and method in accordance with the invention;

FIG. 6 is a chart illustrating data from testing of an alternative embodiment of a composition and method in accordance with the invention;

FIG. 7 is a chart illustrating test results of material properties corresponding to a wet cured process;

FIG. 8 is a chart illustrating the material properties of a dry cured concrete formed by a composition and method in accordance with the invention;

DETAILED DESCRIPTION OF THE PREFERRED EMBODIMENTS

Figure 1:
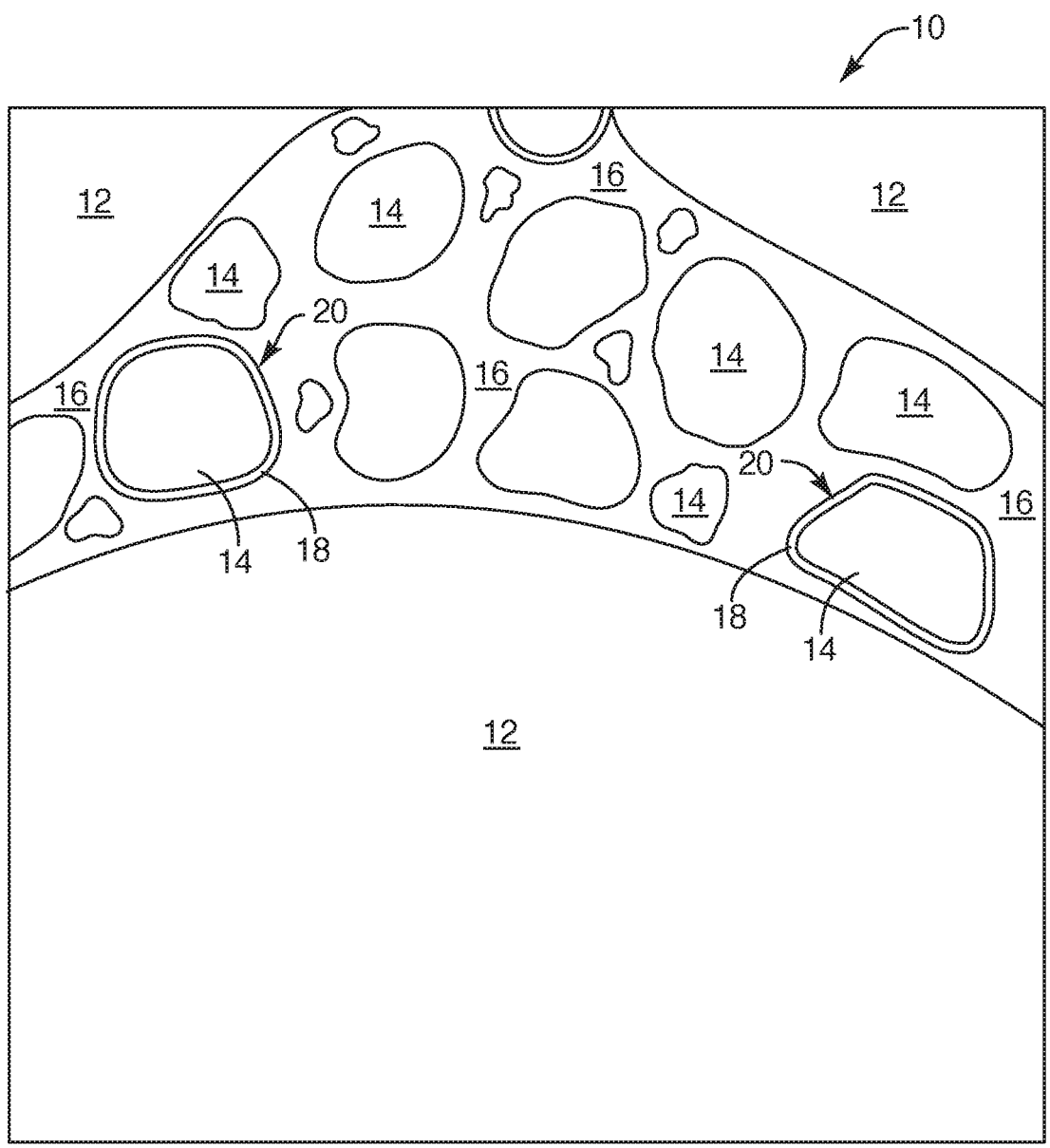
FIG. 1 is a schematic image of a composition in accordance with the invention embodied in a concrete.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a composition 10 may be formulated, combined or mixed, and cast in a suitable containment such as a mold, form, or the like to make an article, footing, foundation, structure, beam, building or portion thereof, or another structure. The composition 10 may exist in a liquidous state, in a plastic state, or in a solid state. By liquidous state is meant that the material will flow, notwithstanding its solid content. By a plastic state is meant that the material may be displaced without rupture or damage, often because it is not sufficiently solid to fracture. It may be in a solidous condition where it has not been strained (either stretched or compressed) sufficiently to cause permanent failure or fracture. By a solid state is meant that the composition has cured, the chemical reactions have occurred to render the liquid portions solid, and the overall material has a solid structure.

The composition 10 may typically include a coarse aggregate 12. Suitable coarse aggregate 12 is typically gravel, rock, or the like, as commonly used in concrete. The composition 10 may also include various types of fine aggregate 14. Fine aggregate 14 in concrete is sand. Sand comes in various nominal "sizes" indicating an effective diameter or the like.

For purposes herein, effective diameter will be defined as that term is understood in an engineering context. Effective diameter is the diameter that would exist if the entire perimeter were placed in a geometry that would cover the entire area. Thus, four times an area divided by the wetted perimeter is the hydraulic diameter or effective diameter. This works out to be the diameter of a circle, cylinder, or sphere as the cross-sectional area, if the actual geometry of interest is purely circular or spherical. This also works out to be the length of a side as an effective diameter if a geometry were exactly a square or cube. Thus, in the limit, an effective diameter of any cross-sectional area works out to characterize the shape as if it had an actual diameter or length of a side. In any other shape the effective diameter is the value dictated by the formula.

Thus, a coarse aggregate 12 may have an effective diameter that is many times, even a hundred times or more, larger than that of the fine aggregate 14. Meanwhile, the fine aggregate 14 may also have a range of effective diameters. Materials by nature and by processing do not necessarily have a consistent effective diameter unless carefully sorted, which they may be in certain circumstances. Thus, the fine aggregate 14 may have a mean or average effective diameter. Every particular constituent piece or particle or granule of the fine aggregate 14 may also have its own effective diameter.

A cement 16 may be a cement of any particular type. For example, plaster of Paris forms a cement. Portland cement is another material commonly used in construction that also operates as a cementitious material. It bonds to itself, adheres to other materials, and mixes with water to form a chemical reaction that increases the weight of the cementitious material by bonding with the constituents of the water.

This chemical bond may be demonstrated by calcining a cement, concrete, plaster, or the like. Temperatures are elevated sufficiently high to break the chemical bonds, drive off the water constituent, and thereby return the cement powder to an unconsolidated, weak, and grindable, or even powdered, state for reuse.

A certain fraction of the fine aggregate 14 may be set aside, or may be introduced from another batch or type of fine aggregate 14. As a practical matter, a layer 18 may be coated on some or all of the fine aggregate 14. It has been found that an amount of from about one percent to about ten percent of the fine aggregate 14 may be produced as discrete granules 20 each coated with a layer 18. Thus, a coated fine aggregate 20 results. The coated aggregate 20 core may be identical to the fine aggregate 14, or may come from a completely different source. It may have a different mean effective diameter, or the like.

Referring to FIG. 1, while referring generally to FIGS. 1 through 11, the composition 10 may be constituted as the coarse aggregate 12, the fine aggregate 14, the cement 16, the coated fine aggregate 20 with the layer 18 applied to each granule 22, and water. In this configuration, the composition 10 is a liquidous material. It contains solids such as the coarse aggregate 12 and the fine aggregate 14, as well as the coated fine aggregate 20. However, it also includes water that is free and water that is mixed or bound with the cement 16.

The portion of water, which is typically characterized by the ratio of water to cement 16, tends to fluidize or lubricate the interaction between the various aggregates 12, 14, 20 thereby promoting a pourable composition 10. Over time, the composition 10 may be poured into a shape defined by a concrete form, pan, mold, or the like. It may be worked by workmen, such as by augering, shifting, vibrating, settling, trowelling, or the like. It may be marked, imprinted, shaped, and so forth.

Over time, sufficient of the cement 16 will react with the water to react by a consolidation of the molecules, constituents, within the cement 16. Thus, eventually, the material becomes a solid throughout. The cement 16 has hardened. Over time, water is used up in the chemical reaction with cement 16, any remainder may be evaporated out and escape through the porosity of the composition 10 remaining, and so forth.

Figure 2:
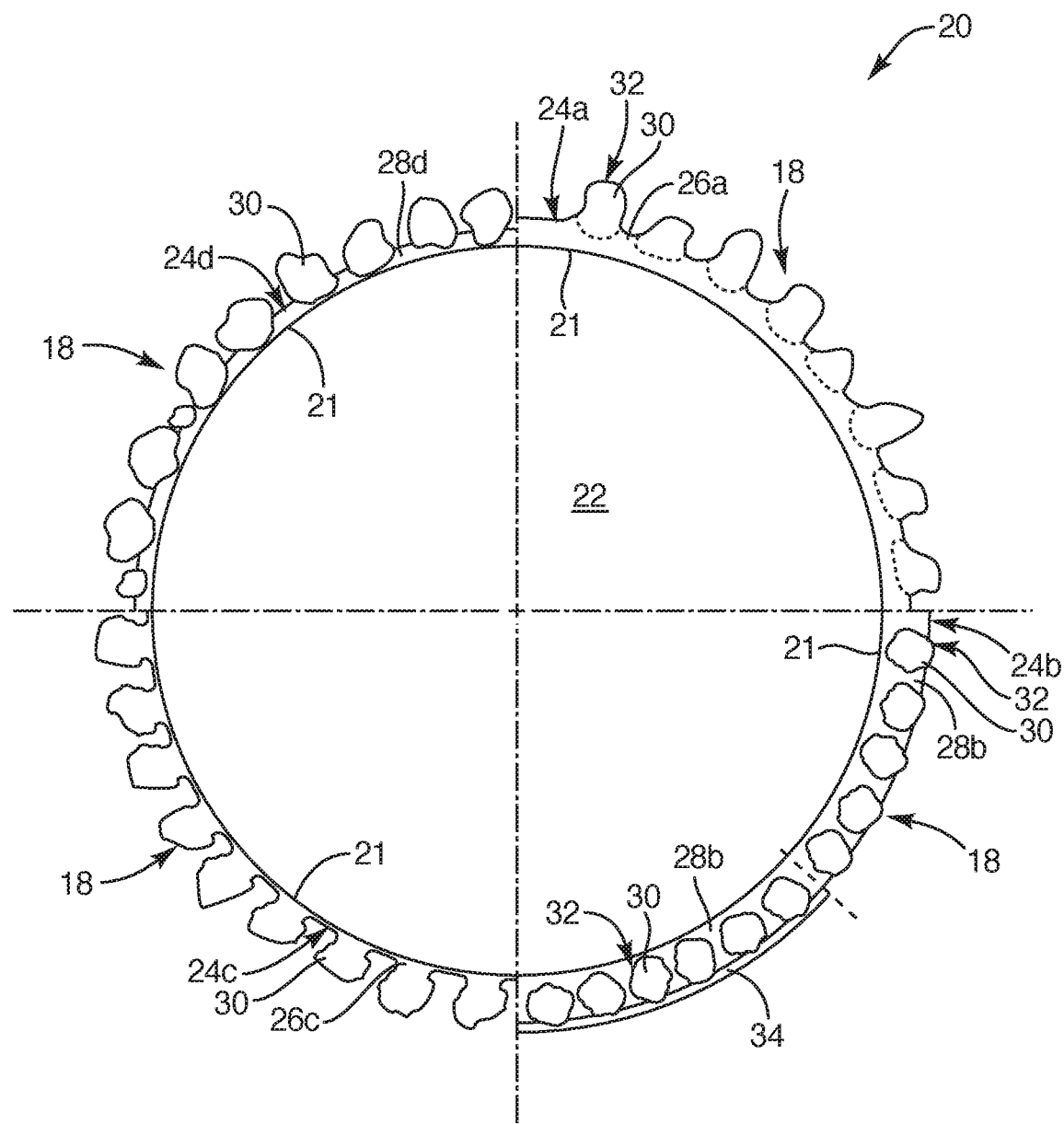
FIG. 2 is a microscopic, cross-sectional view in schematic form of a particle of coated fine aggregate illustrating several optional coating configuration.

Referring to FIG. 2, while continuing to refer generally to FIGS. 1 through 11, the coated aggregate 20, typically coated fine aggregate 20 may be formed by a substrate 22 that is a particle or granule like the fine aggregate 14, or some other similar fine aggregate 14. In certain embodiments, the coated fine aggregate 20 may actually use a substrate 22 of a lightweight aggregate. Lightweight aggregate may be thought of as an organic material that tends to absorb water, or a highly porous solid material that has sufficient capillary action to absorb and store an extra amount of water.

Coarse aggregate 12 does not typically absorb significant water. Some small amount of water may be attached to a surface, may coat a surface, or may embed in certain porosities. Typically very little water adheres to a coarse aggregate 12. Similarly, fine aggregate 14 does not absorb water. However, light weight aggregate is selected to be porous, and may be organic in order to absorb more water.

A substrate 22 may be coated by mixing with a binder 24. The binder 24 may actually be a solvent 26 effective to dissolve a particular polymeric material. Similarly, the binder 24 may be a tackifier 28. It is not uncommon to speak of the binder 24 as a tackifier 28 or adhesive 28. That is, binders 24 may be liquidous in nature and eventually cure to a solidous state. On the other hand, tackifiers 28 may also operate in a liquidous, typically quite viscous, condition to bind materials to the substrate 22. However, tackifiers 28 may cure to a solid or may thicken yet not cure to solids. They may simply remain a very thick or viscous adhesive 28 that adheres.

Thus, a binder 24 may be a solvent 26, may be a mixture of a solvent 26 with a dissolved material therein (as in the first quadrant of FIG. 2), may be a tackifier 28 or adhesive 28, or the like.

In the illustrated embodiment, four quadrants (of circles, starting at noon o'clock) are shown for the substrate 22 as a granule 22. The substrate 22 is shown with various embodiments of a polymer 30 which may be constituted as a powder 32 (fine particles 32) each formed of a polymer 30 comminuted to a comparatively small (compared to the effective diameter of a substrate 22) particle size. This particle size may be characterized as a powder 32 or dust 32. Such materials and processes are described hereinabove and in the references incorporated herein by reference.

Certain embodiments of the coated aggregate 20 may be coated with a shell 34 or a shell layer 34 (see second quadrant) that actually covers the particles 32 in order to delay or otherwise affect the access to those particles 32 by water. Thus, a shell 34 or shell layer 34 may delay activation of the layer 18 of a coated aggregate 20 by delaying the access to water by individual particles 32 of a polymer 30.

In the illustrated embodiment, a shell layer 34 may be the same material as the binder 24, the same material as a tackifier 28, the same material as the polymer 30, or the like. The significance of the shell 34 is that it is an engineered material that is applied in an engineered manner and method that will provide the amount of delayed desired. Thus, for example, the shell 34 may slow the access to, or the rate of absorption of, water by the layer 18.

It should be noted herein that reference numerals followed by trailing lowercase letters refer to specific instances of the item designated by the reference numeral. Thus, it is proper to speak of a reference numeral alone, or of a reference numeral with a trailing alphabetical character. The inclusion of any or all of the examples identified by reference numeral may be implied by the use of the reference numeral alone. The identification of a specific instance and example may be implied by the use of a trailing alphabetical character.

In the illustrated embodiment, the four quadrants illustrate four methods and compositions for coating a layer 18 on a coated aggregate 20. In the first quadrant moving clockwise from the noon position as on a clock face into the first quadrant, one sees an embodiment in which a binder 24a is formed by a mixture of a solvent 26a, and a polymer 30 that coats the substrate 22 sufficiently long that adherence of the polymer 30 as a particle 32 may be done first by surface tension and ultimately by either bonding, dissolving, or both of the polymer 30 in the particle 32. Thus, for example, a polymer 30 such as an acrylamide, typically polyacrylamide or a co-polymer acrylamides is soluble in water.

Similarly, in the third quadrant, the solvent 26a may be water adhered by capillary action to the substrate 22. Contact by a particle 32 of the polymer 30 results in the polymer 30 adhering by the surface tension of the water solvent 26a. Meanwhile, a portion of the polymer 30 dissolves, forming a binder 24 that actually provides a chemical ionic bonding as in the mixture of the first quadrants. Thus, the binder 24a becomes a layer not simply of water solvent 26a, but of a mixture of the solvent 26a and the polymer 30.

In the first quadrant, the dashed lines illustrate that the actual boundary of the particle 32 becomes uncertain, as the polymer 30 may dissolve and flow even to contact the surface 21 of the substrate 22.

The second quadrant or the afternoon or three-to-six o'clock region illustrates an alternative embodiment for creating the layer 18. In this embodiment, the particle 32 of polymer 30 is a material that may be completely different in chemical constitution from a solvent 26, from the material 30, and the like.

For example, this stands in contrast to the first quadrant. That solvent 26a may actually be a mixture of the chemical of the polymer 30, and water or other solvent 26a. Thus, alcohol, water, or the like, as a solvent 26a for the polymer 30 may be mixed with a portion of the polymer 30 until the polymer 30 is dissolved therein. This may form a coating as the solvent 26. Thus, the speed of ionic bonding to the particle 32 of polymer 30 may be greatly enhanced by premixing a solvent 26a with a portion of the polymer 30, until the polymer 30 is dissolved, and thus forms a cohesive bond immediately with the particles 32, after which it partially dissolve the particles 32, forming the layer 18.

In contrast, the binder 24b is a comparatively thicker layer, that will typically extend from ten to 90 percent, and usually from about ¼ to about ¾ of the effective diameter of the particles 32. Thus, the particles 32 may embed in the binder 24b such that the tackifier 28b constituting the binder 24b actually seeps around, and absorbs within it a significant fraction of, the geometry of each of the particles 32.

Also in the second quadrant is illustrated a shell 34 coating the tackifier 28b as well as the particles 32 of the polymer 30. In the illustrated embodiment, the shell 34 may be solid, rigid, or a fluid. It is typically better that the shell 34 be comparatively solid or rigid (not tacky) such that it does not operate as an agglomeration adhesive to agglomerate the particles 32 together. It is best that the coated aggregate 20 remain as discrete particles 32 for purposes of distribution in the composition 10.

Referring to FIG. 2, and specifically looking at the third quadrant, a tackifier 28 or adhesive 28 forming a binder 24 may typically be formed of a material that dissolves the particle 32. More properly, one may say that the solvent 26c coating the surface 21 of the granule 22 or substrate 22 dissolves on contact a portion of the surface 30 or polymer 30 in the dust 32 or powder 32. The result is self adhesion by the particles 32 against the surface 21. Typically, the preference in the embodiment in the first quadrant is that a certain portion of the tackifier 28 is solvent 26a and another portion is dissolved polymer 30. The preferred mechanism in the example of quadrant three is simply a solvent 26c dissolving the polymer 30 as the particles 32 come in contact therewith.

Referring to the fourth quadrant of the illustrated embodiments, the tackifier 28d operating as an adhesive 28d merely contacts the particles 32 of polymer 30 in a mixing process as described in detail in the references incorporated herein by reference. Any suitable mixing process that will gain the desired effect is appropriate.

One concern in most embodiments is the issue of obtaining a sufficiently good coverage by the particles 32 in order to render the tackifier 28d ineffective to agglomerate together distinct granules 22 of the substrate 22. This is typically done by virtue of a comparatively complete coverage of the tackifier 28d by the particles 32 of the polymer 30.

In the illustrated embodiment, the granules 22 adhere in sufficiently high density of numbers that no appreciable amount of the tackifier 28d acting as a binder 24d can make contact between granules 22. Thus, the dusting of the powder 32 or particles 32 is itself an anti-adhesion treatment of the tackifier 28b acting as a binder 24b in the fourth quadrant embodiment.

Figure 3:
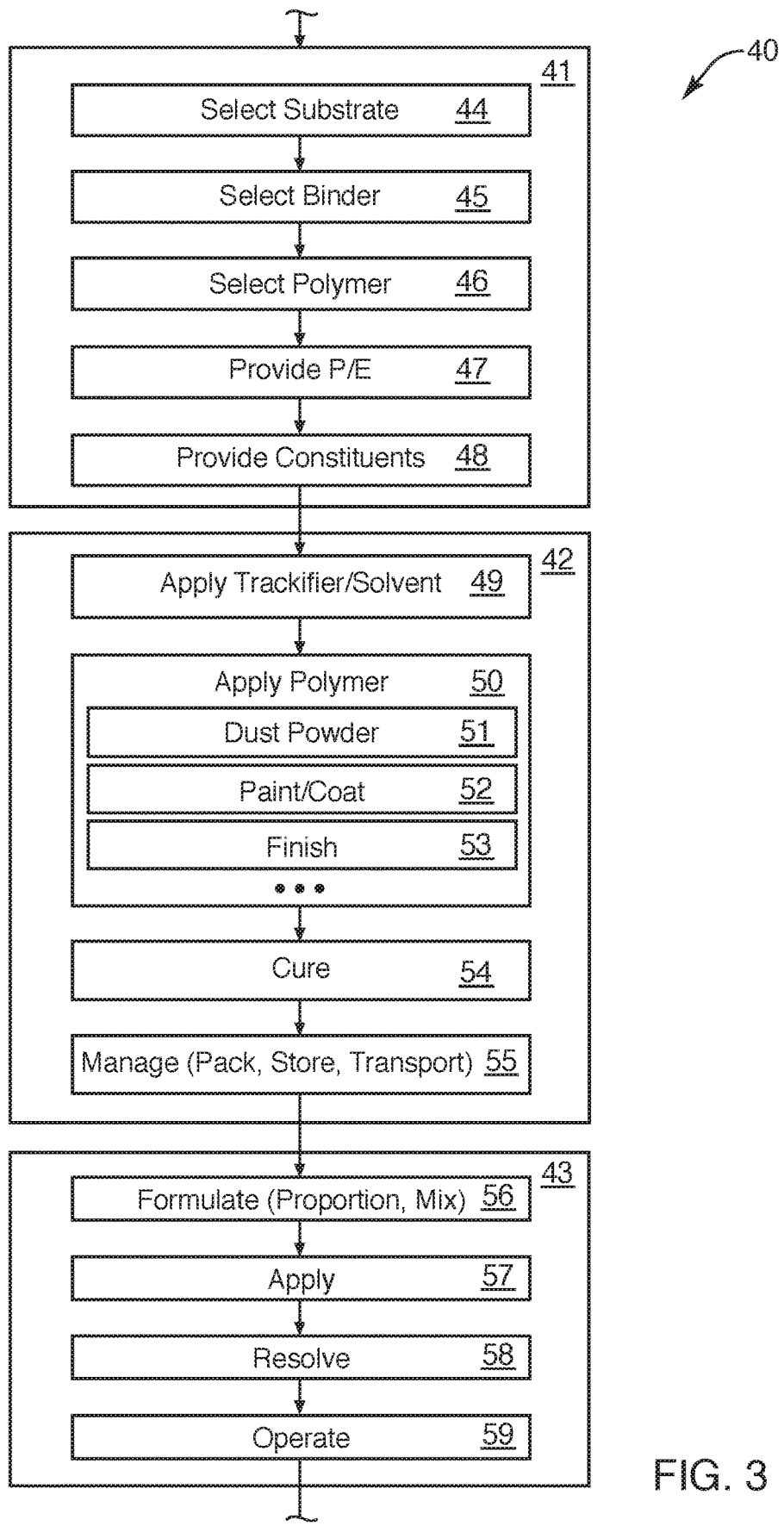
FIG. 3 is a schematic block diagram of a process for providing coated aggregate for use in a formulation such as concrete or other fluid.

Referring to FIG. 3, a process 40 may include setting up 41 or preparation 41 for a coated fine aggregate 20 or CFA 20. The setup 41 may be followed by a manufacturing 42 of the CFA 20. In addition, once manufactured 42, the CFA 20 must be disposed of 43 and thus the disposition process 43 may be undertaken.

One interesting observation is that a composition 10 in accordance with the invention is only one use of the CFA 20. Other dispositions 43 are also available and some are extremely useful such as soil amendments and fracking fluid additives as well as drilling mud additives.

Referring to FIG. 3, while continuing to refer generally to FIGS. 1 through 11, the setup 41 or preparation 41 may include selecting 44 a substrate 22. Selecting 44 may involve certain engineering calculations, reference to standard practices, and the like. As a practical matter, it has been found that a washed sand forms a good substrate 22.

Likewise, it may be advisable as part of the washing, or as a separate process to sort or sieve the substrate 22, in order to provide a more consistent effective diameter thereof. Thus, to maintain a higher fraction of the overall supply of the substrate 22, sized closer to the mean value of effective diameter may be advisable. However, this is not necessarily required. It does provide for a certain amount of consistency.

Selecting 45 the binder 24 is related to selecting 44 of the substrate 22 primarily in that the binder 24 should be compatible. In certain embodiments, for example, the substrate 22 may be an organic material meaning a biological material rather than an inorganic or rock (e.g., inorganic, non-degradable, or other non reactive product).

Selecting 45 the binder 24 is also dependent upon the mechanism for binding as described with respect to FIG. 2 above. Depending on the nature of the polymer 30 that will constitute the particles 32 or powder 32, certain binders 24 may simply not be effective. For example, if a SAP polymer 30 is used, then the binder 24 should be selected to be adhesive in nature as a tackifier 28. This is because the SAP 30 will typically not dissolve in water. Thus such phenomena may not be relied upon to create the binder 24, or tackifier 28 to include SAP as binder 24. On the other hand, some materials 30 may actually have a solvent 26 other than water that may be used as a binder 24 or to create a binder 24. Once evaporated, it will then leave the particle 32 adhered to the substrate 22, to thereafter interact with water by absorbing it.

Selecting 46 a polymer 30 is a matter of engineering design. For example, the type of polymer 30, its processing, its ability to be comminuted or manufactured at a suitable effective diameter, and the like may all be considerations. Likewise, the amount of water that will be absorbed by a polymer 30 is a significant factor in selecting a polymer 30. For example, materials that will absorb 10 times their weight are available, but so are materials that will absorb many hundreds of times their weight. In the contemplated embodiments, SAP polymers, which have been shown to be damaging to the material properties, specifically the mechanical strength properties, of concrete compositions 10, are often not suitable in their manufactured form. However, by selecting smaller particles or by manufacturing smaller particles, a powder 32 having a mean effective diameter that is within the range of from about one hundred to about three hundred microns, and typically targeting at around one hundred fifty microns in effective diameter have been found suitable. Smaller sizes also work, thus sorting may be done simply by a sieve process that removes overly large or small particles 32 from a supply of the polymer 30.

Thus, selecting 46 a polymer 30 may be done in a way that effectively defines the thickness of a layer 18 surrounding a substrate 22. Likewise, obtaining suitable coverage, to resist agglomeration of the particles of substrate 22 to itself or to other granules 20, 22 thereof is important for application and for disposition.

Providing 47 plant and equipment may be done in any suitable manner. Again, the references incorporated herein by reference identify some specific instances of equipment, process parameters, and so forth by which suitable CFA 20 compositions may be made. Thus, mixers, grinders, feeders, dryers, and so forth may be purchased, connected, and otherwise configured for executing a process to combine the substrate 22 with a binder 24 constituted by a solvent 26, tackifier 28, or some combination thereof.

Likewise, if a shell 34 is to be added, then such may be accommodated. Meanwhile, handling the particles 32 of polymers 30 alone, during coating processes for the substrate 22, and thereafter may also be engineered into the provision 47 of the plant and equipment necessary to constitute the CFA 20.

Likewise, a composition 10 may require its own plant and equipment. However, in currently contemplated embodiments, conventional equipment for use in the compounding of concrete compositions 10 may be used as currently constituted. In certain embodiments in the CFA 20, no change in the formation of a concrete composition 10 is required by way of equipment, or the like. That is, no significant change that is not already available is necessarily required.

However, certain steps may be done in a different way, or to a different extent in compounding a concrete composition 10 in order to provide the benefits in accordance with the invention. Thus, more water may be added, and different constituents may be modified. However, those changes do not require (in certain presently contemplated embodiments) any change in the plant and equipment involved in mixing the composition 10 or handling it in its application Manufacturing 42 the CFA 20 may include applying 49 a tackifier 38, solvent 26, both, or other constituents to act as a binder 24. Thereafter, applying 50 a polymer 30 may involve adding a dust 32 or powder 32 as individual particles 32 adhering to the binder 24 and thus coating the granules 22 of a substrate 22.

In alternative embodiments, the polymer 30 may be painted 52 on or otherwise coated 52 as a liquid. It may be cured or dried rather than adhered as a dust 32 or powder 32 coating the binder 24 on the substrate 22.

Finishing 53 may involve adding a shell 34 or outer layer 34 over the particles 32 of the polymer 30. Similarly, a shell 34 may actually surround a coating painted 52 or coated 52 on as a liquid over the substrate 22. Meanwhile, dusting 51 the powder 32 of particles 32 has been found a suitable mechanism and one that provides ready separation of the individual granules 22.

It has been found, however, that using a mixture of a solvent 26 and a polymer 30 provides a suitable binder 24 to receive a dusting 51 of particles 32 of a polymer 30.

It has also been found effective that a tackifier 28 that is comparatively thicker, as illustrated in the second quadrant of FIG. 2, is also effective in certain embodiments for maintaining adherence of the particles 32 or powder 32 against the substrate 22. In other embodiments, where release of the powder 32 is desired, than a comparatively thinner layer of the binder 24, and typically embodied as a tackifier 28, may serve to render the particles 32 separable or strippable from the tackifier 28 at a point after hydration.

Curing 54 may involve drying. Drying may be done in a drying tower as falling granules 20, 22 drift down in an upward, drying flow of air. Curing 54 may also come as a chemical reaction coming to completion. Regardless, curing 54 is primarily a matter of stabilizing the granules 22 with their coating of the polymer 30 either as a dusting 51 of particles 32, a liquid coating 52, solidified, or otherwise.

Managing 55 the CFA 20 may involve packing, storing, transporting, refrigerating, drying, protecting, and otherwise maintaining the stability of the CFA 20. Warehousing may involve protection from heat or humidity, providing suitable aeration, maintaining free from changes in humidity, sealing the CFA 20 against the incursion of local humidity or rain, and so forth. Thus, managing 55 the CFA 20 maintains its consistency, composition, and its operability in the future as a useful constituent in a composition 10 or otherwise.

The disposition 43 of the CFA 20 may involve formulating 56 a composition 10. Formulating may involve determining proportions, effecting actual mixing, or the like. Formulating 56 is a term that is often used to simply mean the design of a composition 10. In other uses, the expression of formulating 56 may involve the actual mixing together of the constituents constituting a composition 10. By either, or both, the proportioning, mixing, rates thereof, and so forth may be selected and accomplished.

For example, in certain embodiments, such as a process for compounding a composition 10, water may be added at different times in different quantities. In fact, a composition 10 using the CFA 20 as a constituent thereof may still be cured as a wet cured concrete or a dry cured concrete. Wet curing indicates that the surfaces are maintained damp or even fully wetted or inundated.

In other embodiments, the dry curing indicates that the outer surface is not wetted, although it may be protected, sealed, or otherwise configured to resist excessive drying or an excessive drying rate. Thus, the water in the composition 10 at the surface thereof is not unduly prejudiced by evaporation or the loss of liquid needed for compounding with the cement 16 itself.

Applying 57 may involve molding, pouring, casting, or otherwise applying 57 the composition 10 to a particular utility. Forming pillars, posts, sidewalks, footings, foundations, walls, floors, and so forth may all involve application 52 of a composition 10. One benefit of an apparatus, method, and composition in accordance with the invention is that the CFA 20 is adaptable to many uses without requiring changes in the equipment or the process steps for using that equipment.

Moreover, it has been found that working times or workability durations have been greatly extended. For example, in certain examples, a control provided only about 1½ hours of total working time. Only during that time could a composition 10 (absent the CFA 20) still be effectively worked without damage to its properties, structure, or the like. In contrast, that time was extended by an additional 2 hours by use of the CFA 20 as a portion of the fine aggregate 14.

Resolving 58 may involve one or more of several processes. Notwithstanding the description herein of concrete design, formulation, mixing, and application 52, the CFA 20 may also be applied 57 in other applications.

For example, Applicant has found in certain examples and tests that one application 57 is as a material 24 placed in the earth as a soil amendment, as a seed treatment, as a seed operating as a substrate 22, and the like. Moreover, the CFA 20 has been found to operate as an excellent proppant and as an introductory material for fracture fluids to provide additives instantly mixing thereinto.

Also, for example, with the deep layer (comparatively deeper tackifier 28) of the second quadrant of FIG. 2, material has been found to be an excellent proppant that travels well into a formation served by a well bore before acting. Similarly, by adding the shell 34 illustrated, even further delays may be created in order to place proppants or the substrates 22 as proppants well into a formation deeply and distantly from their point of introduction.

On the other hand, the lubricity and viscosity of such fluids have been modified readily by using the configuration of the third quadrant of FIG. 2, wherein the particles 32 may be more readily accessible to water, hydrate more quickly, but nevertheless still entrain quickly and well into a well bore fluid. Thus, such embodiments have been found to serve well for introducing additives with minimal mixing, directly into a bore fluid.

In such embodiments, the adhesion of the particles 32 is not as durable as in that of the second quadrant. Thus, this characteristic of the duration of the particles 32 in adhering to the substrate 22 may be engineered. Similarly, according to the embodiments of the first and third quadrants of FIG. 2, durability of a polymer adhesion to a substrate 22 may be engineered, controlled, and used in application 57 of the CFA 20.

Thus, resolving 58 may involve curing 58 of a concrete composition 10. In other embodiments, resolving 58 may involve the disposition of a substrate 22 as a proppant. In other embodiments, resolving 58 may involve the stripping of particles 32 after full hydration, or at some point during hydration to separate from the substrate 22 in order to modify fluid properties.

Ultimately, operating 54 a system relying on the CFA 20 may involve one of several or many of several options. For example, a concrete structure may be put into operation 59 serving the structural needs of supporting loads, vehicles, or the like. Similarly, a concrete structure may operate 59 to act as a footing supporting a foundation, a foundation on a footing supporting a building, or a wall in a structure, such as a building, compound, machine, mounting surface, or the like. Thus, operating 59 may indicate any of the functionalities to which a CFA 20, a composition 10, either, or both may be put.

Figure 4:
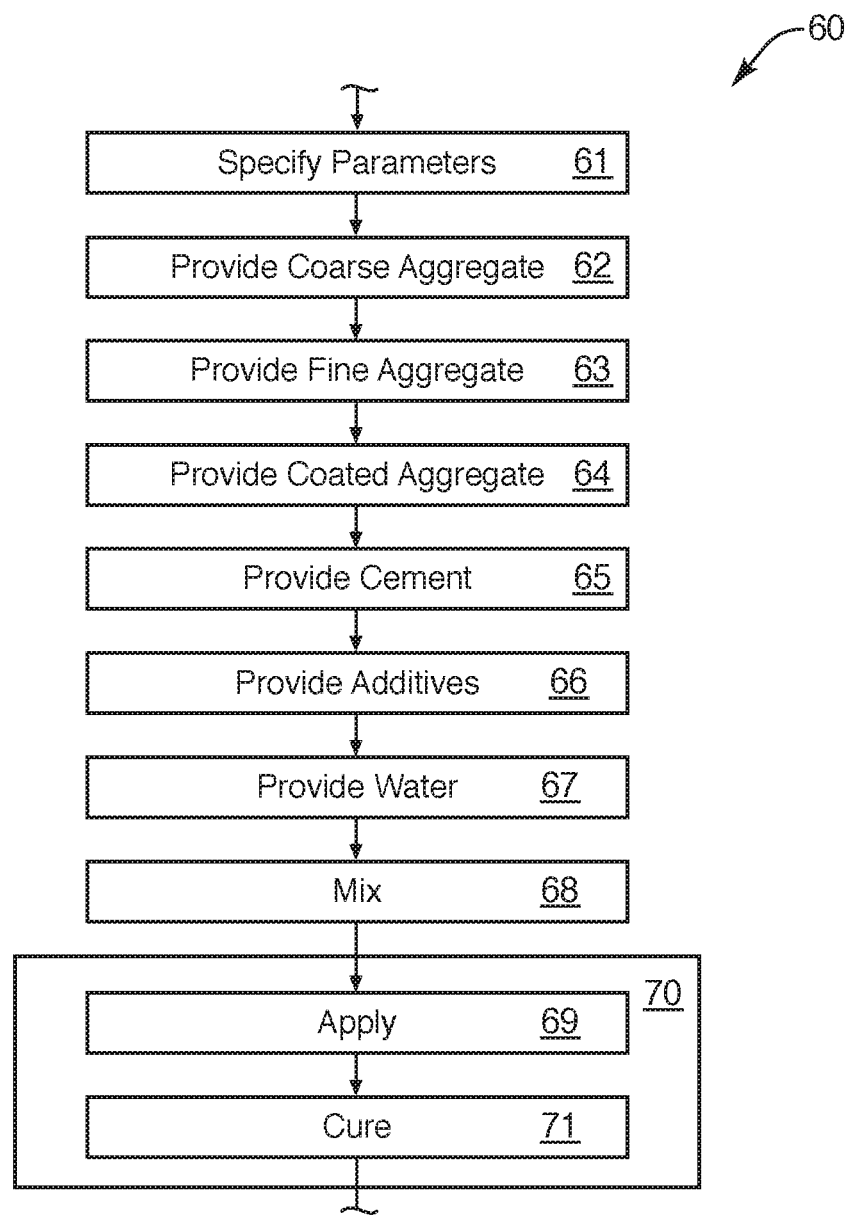
FIG. 4 is a schematic block diagram of a process for manufacturing or formulating concrete using a coated fine aggregate in accordance with the invention.

Referring to FIG. 4, a process 60 for compounding a concrete composition 10 in accordance with one embodiment of the invention is illustrated as a series of steps. In one embodiment, specifying 61 parameters that will control the composition 10 may involve parameters governing the final operation 59 of a concrete structure. Likewise may be imposed certain requirements or parameters controlling the content of the composition 10, its compounding, mixing, casting, or the like. Likewise, the selection of or compounding of a CFA 20 may also be involved in specifying 61 the parameters that will control the composition 10.

Thus, in general, specifying 61 the parameters that will control a CFA 20, its use in a composition 10, or the application 57, resolution 58, or operation 59 of that composition 10 may be engineered in that specification 61.

Thereafter, the equipment may be put into place for formulating, compounding, and applying such a composition. Providing 62 a large aggregate may involve selecting such an aggregate at a particular size, size range, or median size. In certain examples, gravel is used. In many commercial applications, rock from about a ¾ inch (2 centimeters) mean diameter to about a 3 inch (12 centimeters) size has been found suitable.

Providing 63 fine aggregate 14 may involve selecting mean diameter, conditions, such as washing, and the like to remove fine (e.g., dust), and so forth, as appropriate. Ultimately, providing 63 fine aggregate 14 will require ordering, shipping, and the like in order to deliver the fine aggregate 14.

Providing 64 a coated aggregate 20 will typically be the provision 63 of a coated fine aggregate 20. Coating larger aggregate is possible, but is not particularly effective, risks larger void spaces, and defeats part of the purpose of distributing effectively throughout a composition 10 a comparatively small fraction of fine aggregate 14 embodied as coated fine aggregate 20. Thus, providing 64 a CFA 20 may be done by any of the methods shown, and may be compounded by any suitable method as described in the references incorporated herein by reference or other methods.

Providing 64 a coated fine aggregate 20 will typically be done before the fine aggregate 14 is added. It may be possible to add the CFA 20 after the addition of the fine aggregate 14 of a composition 10 during mixing. However, it also provides additional distribution of the CFA 20 by mixing the CFA 20 into the fine aggregate 14, before any fine aggregate 14 is added to the composition 10 during the mixing process.

Providing 66 cement 16 may be done in a conventional manner. Cements are typically of the variety used in concrete referred to as Portland cement, a quarried material that reacts and bonds when mixed with water. Providing 66 additives is a matter of optional design, typically by an engineer who has specified a particular construction with concrete. For example, additives may be provided 66 in order to provide better workability time, faster curing, response to temperatures, and so forth. Thus, providing 66 any particular additives may be done in view of the presence of CFA 20 in the composition 10, or according to other engineering directives.

Providing 67 water may be done in any manner appropriate as specified by the process of mixing 68 the composition 10 for use. Finally, the disposition 70 of the composition 10 may involve applying 69 the composition 10 to a structure, pouring it into a form or mold, such as pouring it as footings, walls, beams, or other structures. Ultimately, curing 71 prepares the composition 10 to perform its operation 59 as a structural system or a structural component in a larger system.

As described herein, curing 71 occurs as a very different process in an apparatus and method in accordance with the invention. The presence of additional water, at a higher w/c (water-to-cement) ratio provides access to water by the molecules of the cement 16 throughout their processes of mixing, curing, and drying.

Referring to FIG. 5, while continuing to refer generally to FIGS. 1 through 11, a chart 80 is shown containing values 82 of various parameters 84 in an example composition 10. In the illustrated chart 80, a control 86 involves a composition 10 absent the CFA 20. Accordingly, the formulation is made as close to that of the test composition 88 or new composition 88, in view of the addition of CFA 20, and its implications for the composition 10.

One will see that the control 86 included 26 pounds of cement 16, with 13 pounds of water, plus 52 pounds of fine aggregate 14, and 52 pounds of coarse aggregate 12, with no lightweight aggregate, no CFA 20, and a w/c ratio of 0.5. The composition 10 was compounded to have a slump of 3 inches (7.6 centimeters).

The test material 88 was compounded to have 26 pounds of cement 16, 19 pounds of water, 47 pounds of conventional fine aggregate 14, augmented by 5 pounds of CFA 20. The coarse aggregate 12 was 52 pounds, and the w/c ratio was 0.73. This w/c ratio was required in order to obtain a slump identical to that of the control 86.

It is typical of the art of construction that using a higher w/c ratio compromises compressive strength. However, a low w/c ration creates difficulty in workability, shortening the time, and rendering the composition 10 less fluid and thus more difficult to work, especially as it begins curing earlier to a solidous state. Plasticizers or "super plasticizers" are frequently added to compositions 10 having a low w/c ratio (e.g., below about 0.5). Such plasticizers typically provide additional workability of the composition 10 without increasing the water content.

Increasing water content tends to create greater slump, meaning that the liquidous properties of the composition 10 may render it not as firm. Thus, such materials will tend to flow too easily, have the aggregate 12, 14 settle too quickly rather than remaining suspended in a homogenous mixture, and so forth.

In the test illustrated, it proved possible to obtain a higher w/c ratio while maintaining strength, and sustaining the level of workability, even improving it. Meanwhile, it was found to enhance internal curing of the composition 10.

The test material 88 was able to absorb or contain about half again more water than the control 86. This was achieved at the same value of slump. Thus, the operational characteristics of the composition 10 in its liquidous state are basically identical to those of the control 86. The CFA 20 thus absorbed about twelve times its own weight in water, which was thereby distributed throughout the entire mix of the composition 10. Meanwhile, because the slump remained identical to that of the control 86, no separation of aggregates 12, 14 out of the mix, no settling thereof, and no localized (e.g., surface) reduction of the density of the concrete was experienced.

The control mix after 7 days of curing had a compressive strength of 1,824 psi (pounds per square inch stress) (12.77 MPa). By day 21, the strength had increased 460 psi (3.22 MPa) to 2,384 psi (16.69 MPa). Finally, at day 28, the usual time at which concrete is deemed to have achieved almost its ultimate strength, and hardness. Therefore, as of the time after which data is usually not taken, the strength had increased modestly by about 116 psi (0.812 MPa) to 2,500 psi (17.5 MPa) of strength or yield stress.

Meanwhile, the test material 88 after 7 days had only 1,620 psi (11.34 MPa) of compressive strength. However, at day 21, the yield stress had increased 800 (5.67 MPa) psi to 2,420 psi (16.94 MPa) compressive stress (strength). Finally, by day 28, the test material 88 had increased yield stress by about 580 psi (4.06 MPa) to 3,000 psi (21.0 MPa). Thus, the strength at day 7 was below that of the cure of the control 86. By day 21, the compressive stress was only modestly (1.5 percent) higher than that of the control 86. However, by day 28, the compressive stress the test material 88 could support was 20 percent higher than that of the control 86.

Thus, the compressive stress test confirmed that the new material 88 made in accordance with the invention provided a higher w/c ratio, providing for better workability, while yet increasing the strength of the concrete composition 10 cured. One interesting sidelight is that the increased water goes into increasing the overall volume of the composition 10. Thus, in the test, the overall volume of concrete was found to increase in various samples by from about five to about ten percent. Thus, in each cylinder tested, there was actually less cement 16, less aggregate 12, 14, and overall less material.

However, the additional stress sustained belies the less material. This has two implications, one is that the actual stress sustained is actually higher. Meanwhile, this means that more of the composition 10 may be supplied. For example, concrete (typically 9%) may be formed with a yield of from five to about ten percent more concrete (typically 9%), and at a higher compressive yield stress. Thus a traditional cubic yard of concrete in this example would have been increased about nine percent. That is nine percent more material to sell with improved properties and increased workability time.

Referring to FIG. 6, another example in accordance with invention is identified in the chart 90 or table 90. In this example, a base 93 operates simply as information. That is, conventional concrete technology provides a formulation identified as the base 93. In this case, the amount of water, aggregate 12, 14, and cement 16, is as indicated. One will note that the w/c ratio is only about 0.38. The control 94 has a higher slump of about 8 inches. Typically, the base 93 may be expected to have a slump of less than eight inches. Typically, the base 93 may be expected to have a slump of about three inches. This will vary somewhat, and thus is illustrated in brackets indicating that it is not actually known because it may be a function of other parameters.

The control, includes the illustrated proportions of cement 16, water, fine aggregate 14, and coarse aggregate 12. No lightweight aggregate nor CFA 20 were included. The w/c ratio was thus 0.51 resulting in a slump of about eight inches (20 centimeters). The lightweight aggregate (LWA) material 96 used a newer technique of adding in with the conventional fine aggregate 14 a lighter weight aggregate, which may be formed of an organic material, such as a plant material, or from a highly porous rock material that has much more space in capillary voids to absorb water.

In this embodiment, the LWA material 96 included the same amount of cement 16, 15 pounds of water, slightly more than the control 94, and 40.2 pounds of fine aggregate 14. Meanwhile, the coarse aggregate 12 was the same for all materials 94, 96, 98 in the test. However, LWA material was 13.4 pounds, adding to an overall constituent mass of 53.6 pounds for all of the fine aggregate 14 in the composition 10. The water added provided a w/c ratio of 0.57 needed in order to achieve the same slump as the other materials 94, 98 in the test.

The new test material 98 included the same amount of cement 16, a greater amount of water than either the control 94 or the LWA composition 96, and much more water than the conventional base 93, by more than double. The result was that fine aggregate 14 was reduced slightly, in order to accommodate 3.2 pounds of the CFA 20. This slight amount of CFA 20 added to provide a total of 54.6 pounds of total fine aggregate 14, including the CFA 20 as a portion thereof. The resulting w/c ratio was 0.79, about half again as large as the w/c ratio of the control 94 and LWA composition 96. However, this was more than double the w/c ration of the base 93 of conventional concrete.

The sand used as fine aggregate 14 was the same in all mixes. The amount of water used is different simply because workability was desired as a fixed parameter and the ability to pour the composition 10 is not only a good comparator but a convenience in the test. The various ratios of w/c were chosen to achieve approximately identical slump between all the mixes used. The additional water required was simply that needed to achieve the consistent values of that same effective operational property of slump.

One striking observation is how much more water was required by the new composition 98 in order to achieve the slump value. This is due to the volume of the water absorbed by the particles 32 of the polymer 30 coating each of the CFA granules 22.

Hereagain, this was observed to increase the volume of the liquidous composition 10 by nine percent. However, the cured sample increased in volume by 13 percent. Thus, nine percent more concrete is available in the mixture of a composition 10 in accordance with the invention. However, less shrinkage occurs in the ultimate structure that is left to operate 59. Thus, the structure was larger by 13 percent. This translates to increased section modulus. Section modulus controls stiffness and strength.

Strength is actually stress, a force per unit area. That number does not change, but the actual value or strength of a structure changes according to how far away from the neutral axis (a term of art from engineering meaning the approximate or effective midline at which there is no stress, compressive or tensile, in bending the beam or structure). Thus, a 13 percent increase in size provides a commensurate larger dimension, with extra stiffness and strength of a particular structure in bending. Thus, the supported stress level is benefitted.

In the illustrated example, the samples were molded in a standard concrete test mold and maintained at room temperature and conditions in a laboratory. The cement 16 was a type I-II Cemex™ Portland cement 16. A Quikrete™ all-purpose gravel (#1151) was used as the coarse aggregate 12. Applicants provided the CFA 20.

All testing was done in a conventional loading apparatus and all three samples were used as per the test mixing procedure and the constituent proportions illustrated. Multiple samples were made in order to obtain repeatability in the results. The samples were tested according to ASTM Standard 469 (American Society for Testing of Materials), for compression strength. Flexural strength was tested according to ASTM Standard C78. Tensile strength was tested according to ASTM Standard C496. Likewise, water absorption or permeability was tested, and shrinkage was evaluated.

Two types of curing were used in the studies. Part of the test was a wet cure in which samples were cured in water. Another was internal or self-curing in which no water was added to the surface, but convention techniques were used to rely on internal curing with only the water content available within the composition 10.

Referring to FIG. 7, the test data is illustrated for the wet cured composition 10. One will note that the chart 100 shows several values corresponding to the various parameters 104 reflecting strength or yield stress. At day seven, the control 94 sustained 2,311 psi (16.177 MPa) of compressive stress. The lightweight aggregate 96 sustained 2,405 psi (16.835 MPa) of stress. Meanwhile, the new material 98 in accordance with the invention sustained only 2,330 psi (16.31 MPa).

Meanwhile, at 21 days, the various material samples 94, 96, 98 were much closer to one another. At day 28, the compressive stress sustained was again almost identical between the materials. The control 94 was slightly less than the LWA material 96, and the new material 98. Flexural strength was virtually identical, within a reasonable range of experimental error. Similarly, the split tension was likewise almost identical. In each case, the new material 98 was slightly better than the control 94, but not significantly so. Thus, while providing a much greater workability, the composition 10 in accordance with the invention did not provide any downside, and provided a nine percent increase in volume of the liquidous composition 10 and a 13 percent increase in volume in the solid state.

Referring to FIG. 8, the sample materials were left to dry and cure based on whatever water was present. This is referred to as internal curing or self-curing. The results are shown in the table 101. Here, at day seven, the control 94 has not had the additional water available at its "outermost fiber" (as the term applies to section modulus and bending stress) or outer surfaces. Thus, it is perhaps not surprising that the compressive strength is reduced below that of the wet cure. The same is true of the LWA material 96 and the new material 98. By day 21, both of the water-bearing samples including the LWA sample 96 and the new material 98 are outstripping the compressive stress sustained by the control 94. By day 28, the LWA material 96 has failed to significantly advance beyond the control 94. Improvement is present but only slight.

By contrast, the new material 98 is on the order of about 25 percent stronger. Flexural strengths are comparative, with the new material 98 being about ten percent stronger than the control 94. The LWA material 96 is slightly stronger than the control 94, and still substantially weaker than the new material 98. Similarly, the split tension, largely a measure of the same tensile strength property, but in a different configuration of direct tension rather than the tension of flexure or bending, provides a similar result.

Figures 9, 10:
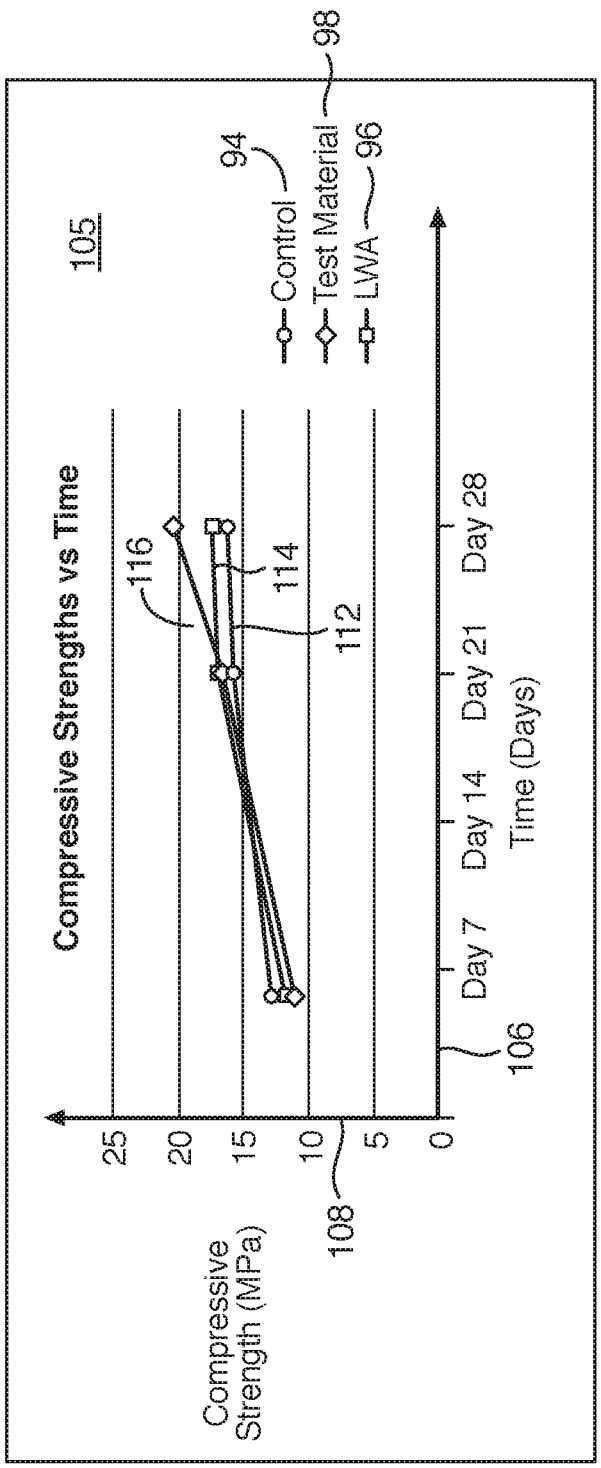
FIG. 9 is a chart graphically illustrating the data for compressive strength of the material of FIG. 8.
FIG. 10 is a chart illustrating permeability measured by absorption of water in a concrete composition formed according to a composition and method in accordance with the invention.

Referring to FIG. 9, the data from the chart 101 is illustrated in the chart 105. The x axis 106 represents time in days, while the y axis 108 represents the strength, this is represented as a fracture due to stress or yield stress (failure stress) represented as a force per unit area. This may be represented in pounds per square inch (psi), MegaPascals (MPa), or the like. In the illustrated test results, one will see that the curve 116 of the test material 98 higher than both the curve 112 representing the control 94 and the curve 114 representing the LWA composition 96. It is not clear that the curve 116 is declining at the same rate as the curves 112, 114.

For example, one will note that the number of points is not sufficient to necessarily fit higher order curves to the data accurately. Additional data points beyond day 28 are not typically taken. However, it is not clear that the strength has ceased its increase. Between days 21 and 28 it is quite clear that the rate of increase of strength or stress support in the control 112 and LWA composition 114 has decreased. Thus, not much additional strength can be expected. In contrast, in new material 98 appears to not be finished with increasing its strength.

Referring to FIG. 10, the porosity or permeability was tested by placing the cured materials into water over a period of time in order to determine the weight gain. Weight gain represents how much water is absorbed into voids in the concrete.

For example, permeability represents not only the amount of void fraction within a solid material, but the ability of water to pass through it. This property allows water and other chemicals to penetrate concrete and render it susceptible to attack by chemical changes, corrosion of reinforcing steel, breaking by frost damage, alkali-aggregate reactivity, and the like. Voids in concrete play a major role in increasing permeability and are typically the result of evaporation of water not utilized in hydration (chemical reaction) of the cement 16 as it turns from an unconsolidated powder to a solid.

Likewise, inefficient consolidation of the fresh concrete may leave voids due to lower slump where the concrete is too stiff and therefor aggregate is not as free to move. For example, this is one reason why various additives may be added to increase the lubricity of the liquidous constituents in a composition 10 while being poured and settled.

The samples cured in water baths were weighed to observe the water uptake. The data was used to get an indirect indication of the permeability of the different samples. The control 94 gained 0.1 pounds in the sample of the particular size tested (a standard 6×3 concrete test mold). Meanwhile, the new material 98 or the CFA augmented material 98 absorbed 0.03 pounds. Meanwhile, the LWA augmented material 96 absorbed 0.11 pounds of water.

One will note that the control 94 and the LWA augmented material 96 performed about the same within about ten percent of one another. However, less than ⅓ as much water was absorbed by the CFA sample.

The w/c ratios used in this experiment are not necessarily those recommended for the majority of concrete work because they may negativity affect strength, permeability, and shrinkage. However, this does suggest that the presence of the polymer 30 may tend to provide smaller voids, and also possibly less connectivity between voids.

Moreover, near the surface of a solid material, any intrusion by water will eventually be halted, and rather quickly so, by the expansion of the polymer 30 remaining in the voids near the surface. Each of the substrates 22 has a thin layer 18 of the polymer 30 that keeps elements from entering the matrix of the solid. It is understood that hydrogen bonding between the polymer 30 and water forms the gel-like substance that was observed in inspection of the tested materials. Thus, the use of SAP or other polymers 30 decreases permeability by excess water from rain, snow, immersion, spray, or the like.

Figure 11:
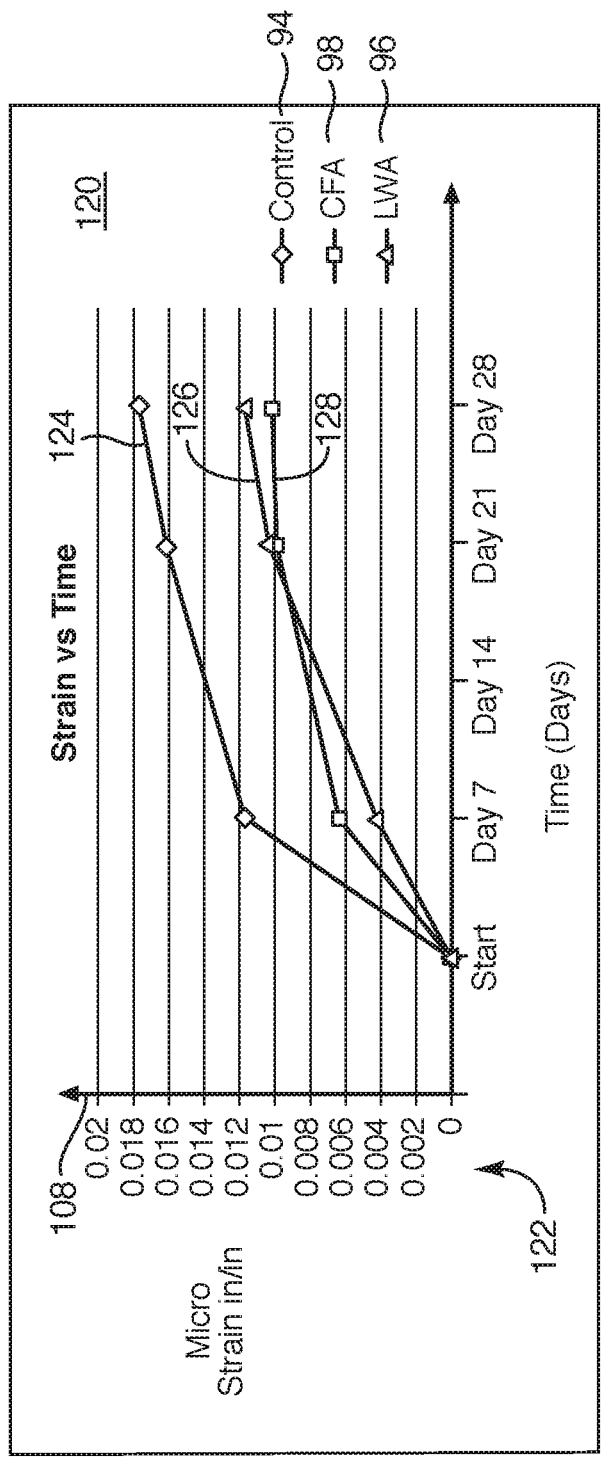
FIG. 11 is a chart illustrating curves of strain in dimensionless units of length per unit length in a drying concrete sample from a composition and method in accordance with the invention for a controlled, a lightweight aggregate, and a coated fine aggregate composition.

Referring to FIG. 11, shrinkage was also evaluated. Cracking in concrete in many instances is due to dimensional changes during the curing process. For example, near the surface, water is not only consumed in a chemical reaction with cement 16 throughout a concrete structure, but a certain amount of water is evaporated at the surface. That evaporated water is both unavailable during the cure of the cement 16 in its ongoing chemical reaction during the cure process, but also results in shrinkage, prematurely, near the surface, resulting in small cracking.

Thus, plastic shrinkage happens within the first few hours after mixing due to the chemical reaction. Autogenous shrinkage is shrinkage due to the hydration of process or water uptake inside. Plastic shrinkage is "plastic" in the engineering sense that it does not result in yielding of the material. The material shrinks and does so plastically. That induces no stress, and does not result in fracture. On the other hand, autogenous shrinkage results from the chemical reaction inside and the uptake of water by the cement 16. This results in a certain amount of shrinkage of the bulk volume of material. Meanwhile, shrinkage, or water lost to atmospheric evaporation was not participating in the chemical reaction with the cement 16, but is lost by the permeability of the concrete to the surrounding atmosphere during the process of curing and drying. Thus, drying shrinkage is likewise real and results in shrinkage.

There is also some amount of carbonation shrinkage due to the chemical reaction of carbonation over extremely large periods of time. It has been found here in the chart 120 of FIG. 11 that over the time illustrated on the x axis 106, the actual micro strain in length per unit length, a dimensionless parameter, and thus correct for any system of units, is different for each of the materials 94, 96, 98.

For example, the values 122 of strain 122 as represented on the y axis 108 are illustrated in the curves 124, 126, 128 the control curve 124 shows that substantial strain or change in dimension exists in the control 94. The LWA-modified material 96 is much improved, due to its additional availability of water in the capillaries in the lightweight aggregate. Meanwhile, the CFA-augmented material 98 provides the least strain, at the latest measurement at 28 days. However, intermediate that time, and the start date, at seven days, the LWA-modified material 96 actually had less strain. This seems to indicate something about the rate of release of water as well as total amounts in the different materials 96, 98.

When a super absorbent polymer (SAP) 30 was added by a coating layer 18 on a coated fine aggregate (CFA) 20 configured as a granule 22 or substrate 22 having the coating 18, the overall composition 10 absorbed more water while maintaining the same value of slump, which reflects the workability of such a composition 10. The composition 10 appeared to absorb water both as a matter of surface tension among all the constituents, as well as by absorption through a polymer 30 in the coating 18 of the CFA 20.

It appears that hydration is the key to increase strength and is driven by the availability of water for chemical reactions required by the molecules of the cement 16 material. Beyond an initial seven day curing duration, significant improvement in compressive strength for a dry cured concrete (internally cured or internal cure) is not available. Whatever fluid was available inside the sample has been used. In the improvements in accordance with the invention, swelling and absorption of water by a polymer 30 through osmotic uptake appears to rely on the high concentration of ions within the SAP 30. Elastic forces within the polymer 30 itself keep the swelling within certain limits, however large.

Desorption of water presents a balance between the cement 16 constituted as a paste and the polymer 30. Meanwhile, capillary pressures appear to aid in the release of water. Of course, capillary pressures are particularly low but do increase somewhat with age.

Lightweight aggregate 96 shows that the contained water is released within about three to seven days after pouring. Polymers 30 used in previous mechanisms or previous configurations have been inconsistent for a variety of apparent reasons. Polymers alone do not disperse well, they tend to become tacky and agglomerate with one another. They tend to absorb too much water forming large voids once they become desiccated. This causes stress concentrations resulting in reductions of compressive strength and crack formation due to surface desiccation.

It appears that coating the substrate 22 with the polymer 30 in a dust 32 or powder 32 configuration overcomes the previous problems. First of all, the weight of a granule 20 of a CFA 20 is dominated by the substrate 22 itself, which amounts to some version of an aggregate 14. Thus, mixing is readily effective to distribute the polymer 30 with a fraction of fine aggregate 14 constituted as a CFA 20.

More water is available in the mix, and the holders of water, the particles 32 of the polymer 30 are more dispersed, distributed more widely, more uniformly, and in much smaller quantities of polymer 30. Moreover, even within each CFA 20 constituted as a single granule 20, the relative sizes of the particles 32 of the polymer 30 may be considerably smaller than those causing "inclusions" in concrete in previous experiments.

More water (higher w/c ratio) is absorbed for the same value of slump, thus providing more water during cure, equivalently excellent workability, with even greater workability time frames. Thus, slump controls how workable the concrete is at the moment that work begins. However, the longevity of that workability is extraordinary by using the CFA 20 in accordance with the invention.

Voids must continue to exist in the layer 18, once the concrete has been fully cured and desiccated. However, the dimensions of such voids are so small, and so thoroughly distributed, as even only a fraction of about ten percent or 1/10 of the total fine aggregate 14 is constituted in the CFA 20. Meanwhile, fine aggregate 14 only constitutes half the total aggregate.

Also, the significance of the voids diminishes by their small size and wide distribution. Moreover, localized failures about a single granule 22 should appear to be minimized from and restricted from propagating due to the fact that there is a solid within every void, namely the granule 22 of sand or aggregate 14 that forms the core of a CFA 20. This is a stark contrast to large voids left by SAP added directly to concrete mixes.

The rate at which water is released is reflected in the fact that the composition 10 in accordance with the invention contains 50 percent more water in one example yet provides the same slump. This means that less free water exists to fluidize and lubricate the aggregate 12, 14 in the composition in its liquidous configuration. However, over time, that same water is necessary or beneficial for augmenting reaction of the cement 16 in its own bonding. It is local and available. The migration path is very short. The mean distance between adjacent CFA 20 particles 20 as individual granules 20 seems comparatively small. Simply looking at the ratios in the samples for the materials illustrates that the cement 16 is the least of the dry materials. Only the polymer 30 is less in the compositions 10 in accordance with the invention.

The availability of water during the reaction process is illustrated amply in the test data by the improved strain rates observed. Less strain indicating less shrinkage correlates to the region where a substantial increase is obtained in compressive strength.

Permeability appears to be improved by two mechanisms. First, because the layer 18 constitutes such a small fraction of the overall volume of each granule 22 of the CFA 20 (the substrate 22 dominates the volume from a very thin layer 18 coats it), the cement 16 tends to close in around each granule 22. In contrast to other systems, large voids and intraconnectivity between voids is thereby avoided.

Moreover, water that would ordinarily be free water within the matrix of aggregate 12, 14 and the cement 16, resulting in drying out and exiting to leave behind voids, has instead been wrapped around the outside layer 18 of each CFA 20. Thus, free water may actually be reduced yet available for curing.

Finally, the layer 18 remains behind, forming the void but also containing the polymer 30 that was originally configured as particles 32 or powder 32. Upon rehydration from an outside source (absorption of water through the pervious matrix), the polymer 30 in the layer 18 will expand again and absorb water when the water is present. This results in an immediate damming of water from further hydrating the interior of a structure. Thus, there is less porosity or perviousness to liquids and chemicals that may attack concrete in weathered, underwater, or other hydrated environments.

Meanwhile, the water volume that is added results in not only its own volume, but additional space amounting to about nine percent of the overall volume of the resulting composition 10. Moreover, after curing, that volume percentage increase is about 13 percent over the control 94. Thus, the liquidous composition 10 is nine percent greater in volume, and shrinks less, resulting in a net 13 percent greater volume in a cured sample over a comparable control 94.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A composition comprising:
    a fine aggregate comprising granules having an average effective diameter effectively equivalent to an average effective diameter of sand; and
    an admixture powder suitable for use with the fine aggregate and individually powder coated onto at least a portion of the fine aggregate.

2. The composition of claim 1, wherein the powder is bound by a binder to the granules individually, as a substrate.

3. The composition of claim 2, wherein the binder is a liquid admixture that binds at least a portion of the admixture powder to the fine aggregate.

4. The composition of claim 1, wherein the coated fine aggregate further comprises a shell.

5. The composition of claim 3, wherein the coated fine aggregate further comprises a shell.

6. The composition of claim 1, wherein the admixture powder is comprised of at least two polymers selected from the group consisting of: a natural polymer, an acrylamide, an acrylamide co-polymer, a polyacrylamide (PAM), and a super absorbent polymer (SAP).

7. The composition of claim 6, wherein the admixture powder is comprised of guar.

8. The composition of claim 1, wherein the admixture powder is comprised of at least two powders selected from the group consisting of: a lignosulfate, a guar, a natural wood resin, a nitrite salt, a polyacrylamide, and a superabsorbent polymer.

9. The composition of claim 8, wherein the coated fine aggregate further comprises a shell.

10. The composition of claim 8, wherein the admixture powders are bound by a binder to the granules individually, as a substrate, and the binder is a liquid admixture that binds at least a portion of the admixture powders to the fine aggregate.

11. The composition of claim 10, wherein the coated fine aggregate further comprises a shell.

12. A method of producing a composition, the method comprising:
    selecting a fine aggregate comprising granules having an average effective diameter effectively equivalent to an average effective diameter of sand;
    selecting an admixture comprising a powder having particles, dry, discrete, and comminuted to a size smaller than the fine aggregate; and
    coating, by powder coating, a portion of the fine aggregate with the admixture in a manner that maintains the portion as individual granules.

13. The method of claim 12, further comprising:
    washing the fine aggregate after selecting the fine aggregate; and
    drying the fine aggregate so the fine aggregate is over 95% dry.

14. The method of claim 12, wherein the admixture comprises two admixture component powders selected from the group consisting of: accelerators, corrosion inhibitors, shrinkage reducers, superplasticizers, water reducers, retarders alkali silica reactivity inhibitors, biopolymers, viscosity modifiers, air entrainment compounds, polyacrylamides, and superabsorbent polymers.

15. The method of claim 12, further comprising:
    coating, by powder coating, the portion of the fine aggregate with a second admixture comprising a powder having particles, dry, discrete, and comminuted to a size smaller than the fine aggregate and in a manner that maintains the portion as individual granules.

16. The method of claim 12, further comprising:
    coating the portion of the fine aggregate with a shell.

17. The method of claim 15, further comprising:
    coating the portion of the fine aggregate with a shell.

18. A method of producing a composition, the method comprising:
    selecting a fine aggregate comprising granules having an average effective diameter effectively equivalent to an average effective diameter of sand;
    applying a binder to the fine aggregate, wherein the binder is a liquid admixture;
    selecting an admixture comprising a powder having particles, dry, discrete, and comminuted to a size smaller than the fine aggregate; and
    coating, by powder coating, a portion of the fine aggregate with the admixture in a manner that maintains the portion as individual granules.

19. The method of claim 18, further comprising:
    washing the fine aggregate after selecting the fine aggregate; and drying the fine aggregate so the fine aggregate is over 90% dry after washing the fine aggregate.

20. The method of claim 18, wherein the admixture comprises two admixture component powders selected from the group consisting of: accelerators, corrosion inhibitors, shrinkage reducers, superplasticizers, water reducers, retarders alkali silica reactivity inhibitors, biopolymers, viscosity modifiers, air entrainment compounds, polyacrylamides, and superabsorbent polymers.

* * * * *